O. K. KAASA.
MOTOR VEHICLE.
APPLICATION FILED OCT. 4, 1913.
1,103,419.
Patented July 14, 1914.
3 SHEETS—SHEET 1.
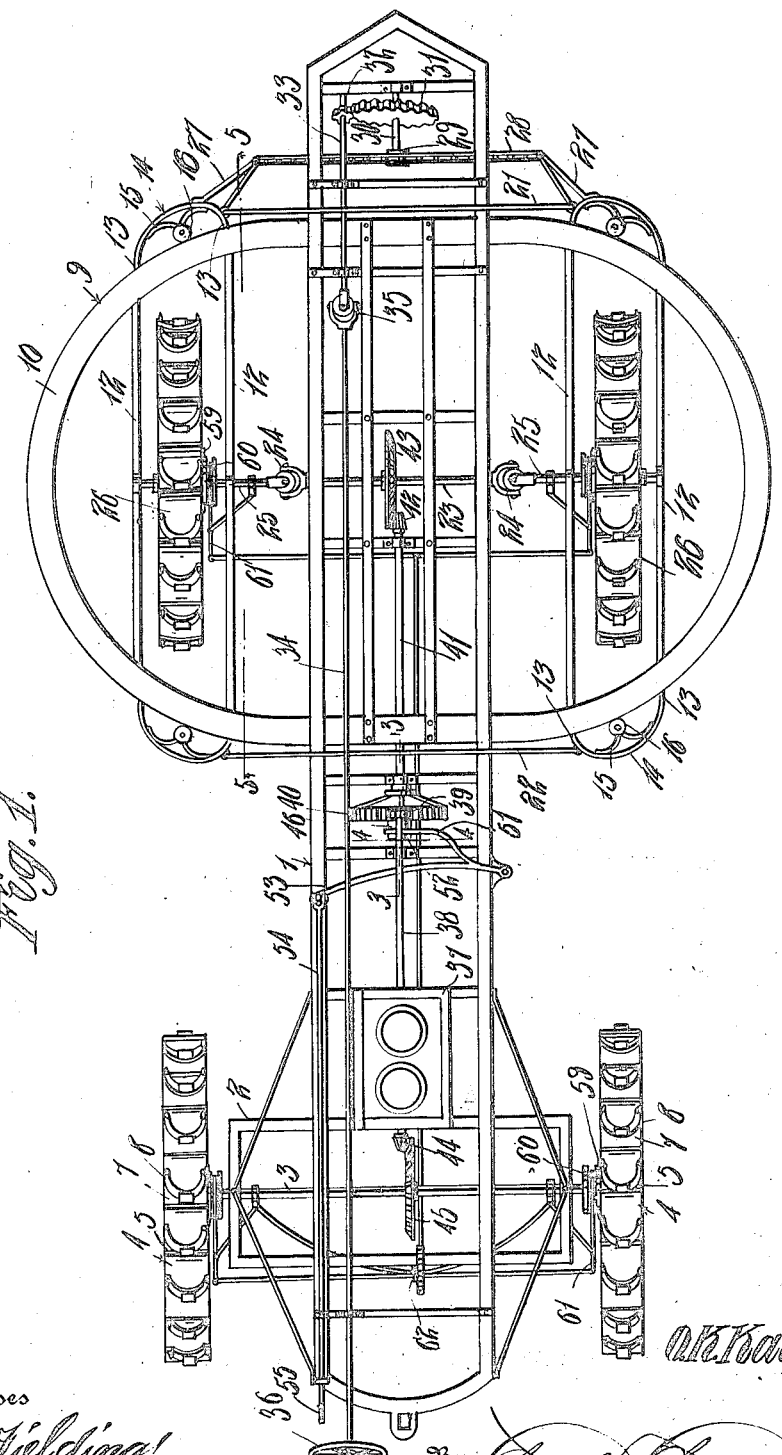
Witnesses
Inventor
O. K. Kaasa,
By
Attorneys

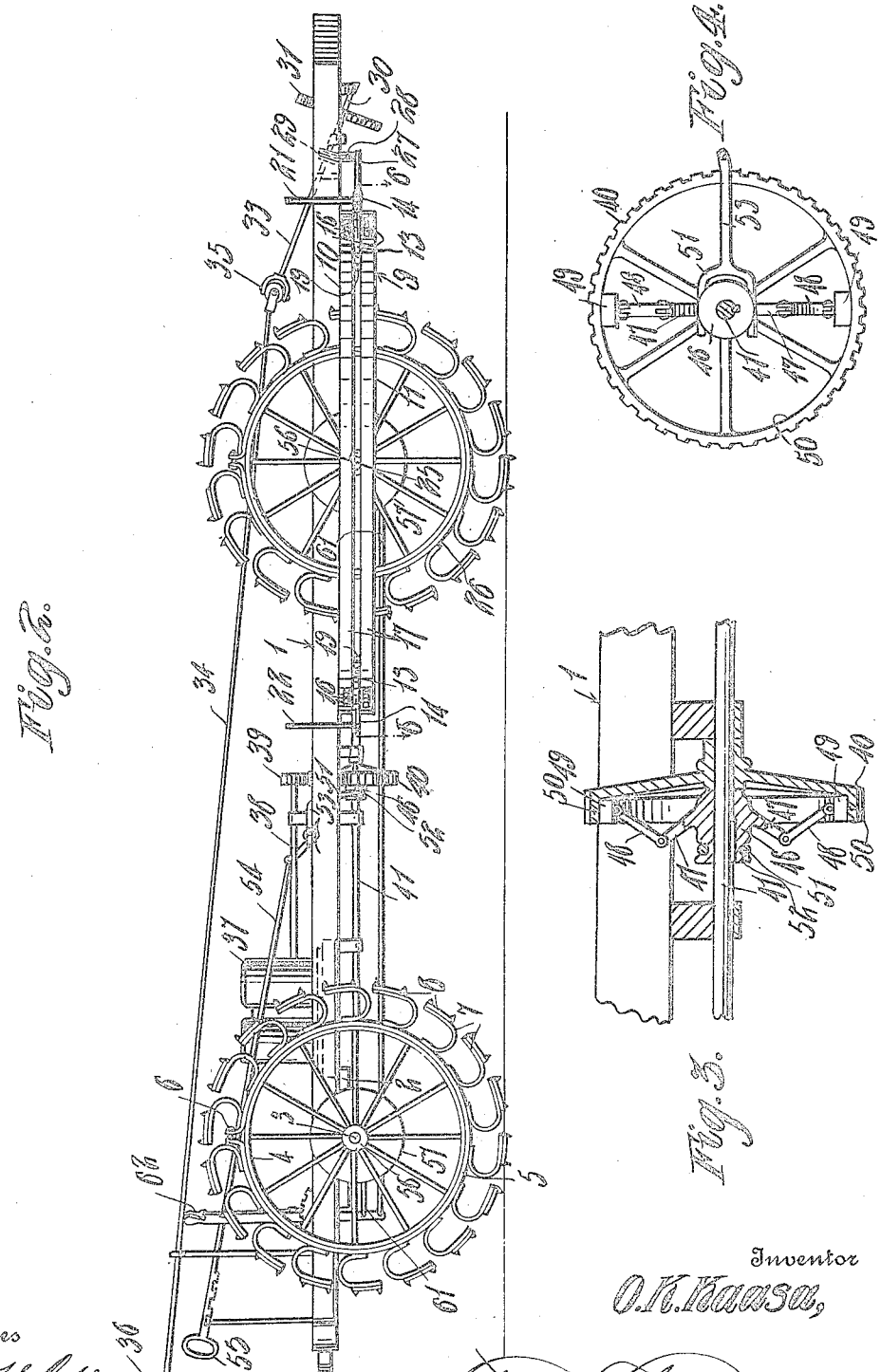

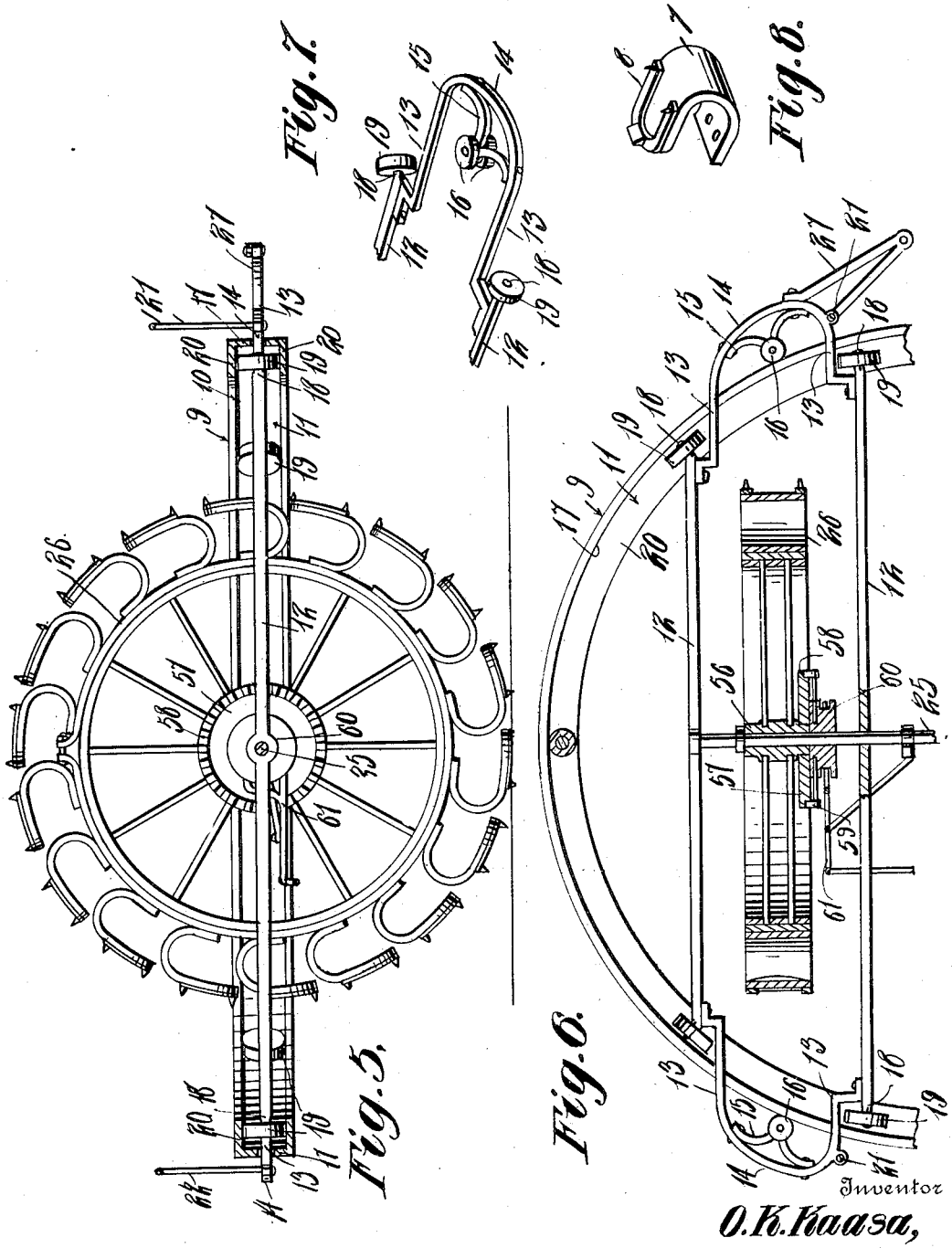

UNITED STATES PATENT OFFICE.

OLE K. KAASA, OF GREENBUSH, MINNESOTA.

MOTOR-VEHICLE.

1,103,419.

Specification of Letters Patent.

Patented July 14, 1914.

Application filed October 4, 1913. Serial No. 793,420.

*To all whom it may concern:*

Be it known that I, OLE K. KAASA, a citizen of the United States, residing at Greenbush, in the county of Roseau, State of Minnesota, have invented certain new and useful Improvements in Motor-Vehicles; and I do hereby declare the following to be a full, clear, and exact description of the invention, such as will enable others skilled in the art to which it appertains to make and use the same.

The present invention is directed to improvements in motor vehicles, and more particularly to one which is propelled by the four traction wheels.

The invention has for its object to provide a motor vehicle especially designed for propelling agricultural machines across a field.

A further object of the invention is to provide a motor vehicle with a novel means for guiding the same.

With these and other objects in view, this invention resides in the novel features of construction, formation, combination and arrangement of parts to be hereinafter more fully described, claimed and illustrated in the accompanying drawing, in which:—

Figure 1 is a plan view of the device. Fig. 2 is a side elevation of the same. Fig. 3 is a sectional view on line 3—3 of Fig. 1. Fig. 4 is a similar view on line 4—4 of Fig. 1. Fig. 5 is a sectional view on line 5—5 of Fig. 1. Fig. 6 is a sectional view on line 6—6 of Fig. 2. Fig. 7 is a detail perspective view of one end of one of the guide yokes. Fig. 8 is a detail perspective view of one of the traction wheel shoes.

Referring to the drawing, the numeral 1 designates a longitudinal frame, the rear end of which being provided with a transversely disposed frame 2 which revolubly supports the rear axle 3, said axle being provided with revolubly mounted wheels 4. Engaged around the rims of the wheels 4 are split bands 5, the same being formed from metal and have their ends connected by bolts 6, as clearly shown in Fig. 2 of the drawing. Riveted to the outer surfaces of the bands 5 are reversely bent metallic plates 7, said plates being provided with shoes 8 which are adapted to engage in the ground to aid in the propulsion of the device. Arranged transversely of the forward part of the frame 1 is an oval frame 9, the same consisting of upper and lower tracks 10 and 11, the same being formed from angle iron. Upon opposite sides of the forward part of the frame 1 are arranged spaced parallel bars 12, the ends of which being connected to the arms 13 of the yokes 14, said yokes having their bight portions provided with brackets 15 which support the rollers 16, which are designed to engage the vertical webs 17 of the track sections 10 and 11.

The ends of the parallel bars 12 are provided with spindles 18 upon which are loosely mounted vertically disposed wheels 19 which are adapted for travel between the horizontal webs 20 of the tracks 10 and 11.

The yokes 14 disposed in advance of the oval frame 9 are connected by brace bars 21, similar brace bars 22 being provided for the rearwardly disposed yokes so that the parallel bars 12 and yokes 14 may be moved in unison to guide the machine.

Journaled transversely of the forward part of the frame 1 is an axle 23 to the ends of which are connected, by universal joints 24 the stub axles 25 upon which are revolubly mounted the traction wheels 26, the same being indentical in construction to the traction wheels 4, hereinbefore mentioned, said wheels 26 being arranged between the parallel bars 12. The axles 25 are journaled in the parallel bars 12 so that the weight of the forward part of the machine is equalized.

Connected to the forward yokes 14 are brackets 27 to which are secured the opposite ends of the flat chain 28 which is engaged by the pinion 29, said pinion being fixed to the shaft 30 which is journaled longitudinally of the forward end of the frame 1, said shaft having also fixed thereto a gear 31, which meshes with a pinion 32 carried by the shaft 33 which is arranged parallel with the shaft 30. The inner end of the shaft 30 is connected to the forward end of the rod 34 by the universal joint 35 so that when the shaft 30 is rotated through the medium of the hand wheel 36 similarly movement will be transmitted to the shaft 33 and shaft 30 which rotates the pinion 29, whereby the chain 28 may be shifted to swing the parallel bars 12 in the desired direction so that the machine may be guided.

Mounted adjacent the rear end of the frame 1 is a gas engine 37, the shaft 38 thereof being provided with a pinion 39, the same being in mesh with the gear 40, said gear being loosely mounted upon the shaft 41, which extends longitudinally of the frame 1 and has its forward end provided with a beveled pinion 42 which meshes with a beveled gear 43 fixed to the axle 23. The rear end of the shaft 41 is also provided with a beveled pinion 44 which meshes with the beveled gear 45, the same being fixed to the rear axle 3, said shaft during its rotation serving to rotate the axles 3 and 23.

Splined upon the shaft 41 is a hub 46, said hub being provided with diametrically opposite arms 47, to the outer ends of which are pivotally connected one of the ends of the links 48, the other ends of said links being provided with shoes 49 which engage the interior surface of the flange 50 of the gear 40 when the hub 46 is shifted in one direction, and disengage the rim when shifted in another direction. When the shoes are in engagement with the flange 50 rotary movement will be transmitted to the shaft 41 from the engine shaft 38, and when said shoes are disengaged from the rim the gear 40 will run idle so that the machine may be brought to a stop without the necessity of stopping the engine 37.

The hub 46 is shifted longitudinally of the shaft 41 by the yoke 51, the arms of which engage the annular groove 52 of the hub. The yoke is pivotally connected to the frame 1 and is provided with an arm 53, to one end of which is connected the rod 54, the other end of said rod being provided with a handle 55 which is arranged in convenient reach of the operator who occupies a position upon the rear end of the frame 1 during the operation of the device so that the movement of the device may be controlled.

The inner ends of the hubs 56 of the traction wheels are provided with disks 57, the same being provided with a circular series of teeth 58 which are engageable by the double pointed pawls 59 carried by the collars 60 which are slidably engaged, but splined to the stub axles 25 and the opposite ends of the axle 3.

The collars 60 are engaged by yokes 61, said yokes serving to move the collars toward or away from the disks 57 so that the pawls carried by said collars may engage or disengage the teeth 58, said yokes being moved upon shifting of the lever 62 which is connected through suitable link connections with the yokes 61.

What is claimed is:—

1. A motor vehicle comprising a frame, a frame disposed transversely of the rear end of said frame, an axle supported by the second named frame, wheels carried by the axle, an oval frame carried by the forward end of the first named frame, said frame comprising track sections, parallel bars arranged in pairs, each pair supporting a stub axle, a wheel revolubly mounted on each stub axle, wheels carried by the bars for engaging the track sections, and means for shifting the parallel bars simultaneously to guide the vehicle.

2. A motor vehicle comprising a longitudinal frame, a transverse frame mounted upon the rear end thereof, a wheeled axle supported by the transverse frame, an oval frame mounted upon the forward part of the longitudinal frame and comprising upper and lower tracks, spaced parallel bars arranged in pairs and upon opposite sides of the longitudinal frame, yokes connecting the ends of the parallel bars, brackets carried by the yokes, rollers carried by the brackets for engaging the outer surface of the tracks, said tracks having horizontal webs, wheels carried by the ends of the parallel bars for engaging the tracks for travel in contacting relation with the horizontal webs, an axle supported transversely of the longitudinal frame, stub axles connected to the ends of said axle by universal joints, said stub axles being supported by the parallel bars, means for rotating the first and second named axles, and means for simultaneously shifting the parallel bars and thus the stub axles to guide the vehicle.

In testimony whereof, I affix my signature, in the presence of two witnesses.

OLE K. KAASA.

Witnesses:
Thomas Roehn,
G. I. Brandt.